United States Patent [19]
Ziegler et al.

[11] Patent Number: 5,162,230
[45] Date of Patent: Nov. 10, 1992

[54] ARRANGEMENT FOR INTRODUCING A GAS INTO THE CAVITY OF AN INJECTION MOLD FOR PRODUCING A HOLLOW PLASTIC BODY

[76] Inventors: Hans-Peter Ziegler, Lerchenweg 19, 7148 Remseck 4; Wolfgang Weissert, Hauptstrasse 12, 7057 Leutenbach, both of Fed. Rep. of Germany

[21] Appl. No.: 631,666

[22] Filed: Dec. 21, 1990

[30] Foreign Application Priority Data

Dec. 23, 1989 [DE] Fed. Rep. of Germany ....... 3942957

[51] Int. Cl.⁵ .................... B29C 49/06; B29C 49/60
[52] U.S. Cl. .................... 425/533; 264/537; 264/572; 425/536; 425/542
[58] Field of Search ............. 425/533, 536, 535, 522, 425/542, 577, 326.1; 264/572, 537, 573, 574

[56] References Cited

U.S. PATENT DOCUMENTS

| | | | |
|---|---|---|---|
| 2,405,149 | 8/1946 | Kempthorn | 425/522 X |
| 3,663,143 | 5/1972 | Fischer | 425/533 X |
| 3,993,427 | 11/1976 | Kauffman et al. | 425/529 |
| 4,020,137 | 4/1977 | Lachner et al. | 425/535 X |
| 4,101,617 | 7/1978 | Friederich | 425/533 |
| 4,106,887 | 8/1978 | Yasuike et al. | 425/535 X |
| 4,295,811 | 10/1981 | Sauer | 425/533 X |
| 4,740,150 | 4/1988 | Sayer | 425/542 |

FOREIGN PATENT DOCUMENTS

2122130 1/1984 United Kingdom .

*Primary Examiner*—Richard L. Chiesa
*Attorney, Agent, or Firm*—Walter Ottesen

[57] ABSTRACT

An arrangement introduces a metered volume of gas into a cavity filled with a melt of plastic. The cavity is defined by an injection mold for producing a hollow plastic body and the injection mold has an injection channel for introducing the molten plastic into the cavity. The arrangement includes a gas-injection nozzle assembly having a housing mounted in the mold and a member displaceably mounted in the housing so as to be movable between a first position and a second position located in spaced relationship to the injection channel. The housing and the member conjointly define a forward end portion of a nozzle assembly facing into the cavity at a region of the cavity spaced from the injection channel. A conducting channel in the forward end portion conducts the gas into the cavity when the member is in the second position. The conducting channel defines a gas-discharge opening for discharging the gas into the cavity. The gas-discharge opening is freely projected approximately into the center of the region at which the nozzle assembly is located to thereby discharge the gas when the member is in the second position thereof and while the melt is injected into the cavity.

11 Claims, 2 Drawing Sheets

ARRANGEMENT FOR INTRODUCING A GAS INTO THE CAVITY OF AN INJECTION MOLD FOR PRODUCING A HOLLOW PLASTIC BODY

FIELD OF THE INVENTION

The invention relates to an arrangement for introducing a gas such as nitrogen into the cavity of an injection mold for producing a hollow plastic body in accordance with the so-called trapped-gas pressure process.

BACKGROUND OF THE INVENTION

Essentially two basic processes are known for producing hollow plastic parts.

A first process is disclosed in U.S. Pat. No. 4,101,617. In this process, the melted plastic or so-called plastic melt is injected into the cavity of the injection mold in a first step. Thereafter, gas under pressure is injected through the same nozzle through which the plastic melt was introduced. The gas under pressure is introduced into the mass which is still formable such that the plastic mass fills out the mold and becomes rigid under the gas pressure which is introduced directly into the melt and maintained. Thereafter, the gas pressure is reduced to atmospheric pressure for opening the mold and the completed hollow body can be removed.

Another process is disclosed in U.S. Pat. No. 4,740,150 which is different from the above method in that the plastic melt and the gas (nitrogen or air) are introduced at different locations of the mold by means of separate injection devices.

In the second process, the injection of the pressure gas takes place via an injection device independently of the feed system for the plastic melt. In this process, the gas-injection device is mounted independently of the plastic feed system at another location of the injection mold especially suitable for metering the gas. This is especially advantageous for the production of hollow bodies having large or complicated cross sections. However, a disadvantage is associated with this process of separate injection of the plastic melt and gas especially with respect to plastic melts made of polyamide. The disadvantage is that the plastic melt cools relatively rapidly after being introduced into the mold and in this way forms a skin at the region of the walls of the hollow injection mold through which a rapid and loss-free introduction of premetered gas quantities into the hollow mold is hardly possible. If, however, the premetered gas quantity introduced into the mold for maintaining a pregiven inner gas pressure is not complete (that is not without loss), then fluctuations occur in the wall thickness of the hollow body to be manufactured as well as uneven surfaces which causes the manufactured body to be unusable and therefore leads to scrap. Depending upon the configuration of the injection mold for the plastic hollow body to be produced, the gas-injection nozzle for introducing the gas cannot penetrate the melt skin, which has already formed, without difficulty. The skin can easily bulge outwardly when inserting the needle-like gas-injection nozzle whereby the skin lifts inwardly with an edge layer off the wall of the mold so that the injected gas only partially flows into the inner hollow mold and with delay; whereas, another portion of the gas quantity flows outwardly and is lost with respect to the injection process. This occurrence is especially disadvantageous when utilizing plastics which are partially crystalline such as the above-mentioned polyamide.

SUMMARY OF THE INVENTION

It is an object of the invention to provide an arrangement wherein the above-mentioned disadvantages are avoided and a reliable introduction of the needle is achieved without damaging or lifting edge zones of the plastic melt already injected and thereby provide a precise metering of the gas quantity introduced into the interior of the melt for the mass production of high-quality plastic hollow bodies so that a trouble-free surface and optimal uniform wall thickness of manufactured hollow bodies is assured. Furthermore, gas losses during the introduction of the gas in the plastic melt disposed in the mold are to be avoided.

The arrangement of the invention is for introducing a metered volume of gas into a cavity filled with a melt of plastic and defined by an injection mold for producing a hollow plastic body. The injection mold has an injection channel for introducing the molten plastic into the cavity and the arrangement includes: a gas-injection nozzle assembly having a housing mounted in the mold and a member displaceably mounted in the housing so as to be movable between a first position and a second position located in spaced relationship to the injection channel; the housing and the member conjointly defining a forward end portion of the nozzle facing into the cavity at a region of the cavity spaced from the injection channel; gas-conducting means formed in the forward end portion for conducting the gas into the cavity when the member is in the second position; the gas-conducting means defining a gas-discharge opening for discharging the gas into the cavity; and, means for freely projecting the gas-discharge opening approximately into the center of the region for discharging the gas when the member is in the second position and while the melt is injected into the cavity.

In the arrangement of the invention, the forward end portion of the gas-injection nozzle with its gas-discharge opening communicating with the cavity projects into the portion of the cavity of the mold assigned to the gas-injection nozzle during introduction of the plastic melt and is charged by the latter. For this reason, the end of the gas-injection nozzle disposed in the cavity of the mold becomes uniformly and so intensely heated on all sides during each injection phase of the plastic that the temperature of this nozzle is more than 50% greater than with a decentralized location of the nozzle end outside of the actual cavity of the mold. Because of the contact with the highly heated plastic melt and because of its central position in the cavity of the injection mold, this end portion of the nozzle becomes heated convectively as well as from radiation of the melt mass, heated to approximately 250° to 280°, such that the inherent heat of the forward part of the nozzle is sufficient to protect the plastic melt against cooling in the penetrated region and to protect against the skin formation associated therewith or, in the event that a skin has already formed, enables a rapid penetration of the gas-injection nozzle through the skin-like solidified melt. In this way, the leaks which occur at the gas-injection location and the exit of gas with gas loss are avoided.

The dimensional accuracy and the texture of the plastic parts to be formed is considerably improved especially also in the region of the surface of these parts. Furthermore, the inner gas pressure during the dwell time during which the plastic solidifies in the mold can be uniformly maintained whereby specific disadvantages are likewise obviated. There is no longer a bulging or lifting of the solidified skin-like coating during the injection operation of the gas-injection nozzle because, as a consequence of the intense warming of the forwardmost region of the nozzle, the skin-like coating of the plastic melt immediately warms again when coming in contact with the forwardmost part of the nozzle which is advantageously configured so as to be pointed. In this way, the resistance to penetration of the forward nozzle portion in the melt is reduced. The temperature drop previously existing of approximately 50° to 80° between the plastic melt and the forward nozzle portion can be reduced. It has been shown that the temperature of the forward end portion of the gas-injection nozzle is only approximately 10% less than the temperature of the injected polyamide plastic melt. In this way, it is possible to dissolve solidified peripheral zones of the melt without externally heating the gas-injection nozzle; that is, the formation of a peripheral zone as a consequence of cooling in this forward region of the injection nozzle is entirely prevented so that a trouble-free and rapid insertion of the gas-injection nozzle and a loss-free introduction of the pregiven gas quantity are possible.

According to an advantageous embodiment of the invention, the forward end portion of the gas-injection nozzle is configured as a guide for its ram with this guide being configured as a guide sleeve.

The ram of the injection nozzle advantageously includes a longitudinal channel for conducting gas toward the cavity and another gas channel opens into the longitudinal channel. The ram can be biased by a spring.

In a further embodiment of the invention, at least the portions of the gas-injection nozzle projecting into the cavity of the mold can be made of a material having a high thermal capacity such as steel, aluminum or the like. A material of this kind draws in the heat of the plastic melt rapidly and stores the same for a sufficient amount of time. It is also conceivable to provide the forward portion of the nozzle with a suitable insulation for storing the heat.

An advantageous measure for increasing the heat capacity of the forward end portion of the injection nozzle is seen in that the mass of the free end portion of the ram lying in the mold cavity is greater than the portion of the sleeve disposed in surrounding relationship to the ram and likewise lying in the mold cavity. The ram then is heated more than the sleeve disposed in surrounding relationship to the ram and this condition is advantageous for penetrating the peripheral coating of the melt. The wall thickness in the region of the free end of the injection nozzle disposed in the mold cavity is less than in the region lying further outwardly especially outside of the mold cavity whereby the heat conductivity to the injection region disposed outside of the cavity becomes less and thereby increases the thermal capacity of the nozzle.

When the nozzle of the ram penetrates the peripheral zone of the plastic melt, it is desirable to reliably prevent the lifting of the smallest regions of this melt from the nozzle or from the sleeve surrounding the nozzle and to prevent portions of the injected gas to escape to the ambient during the injection. This is achieved according to a further feature of the invention which provides that the end of the gas-injection nozzle freely projecting into the mold cavity is so configured that this nozzle together with the melt located in the cavity form a seal against the escape of the injected gas.

This condition is obtained in that the part of the guide projecting into the mold cavity, such as in the form of a sleeve, has projections extending as symmetrically as possible over its cross section perpendicular to its longitudinal axis. These projections increase its outer cross section approximately in the radial direction from the guide. Such projections can, for example, be cam-like or annular and be made of a suitable metallic or non-metallic material. Rubber can be used as an appropriate non-metallic material.

According to another embodiment of the invention, the projections of the guide sleeve are configured so as to be of annular configuration preferably in the form of an annular cylinder surrounding the outer surface of the sleeve in spaced relationship thereto. The annular cylinder and the outer surface of the sleeve then conjointly define an annular gap. This annular gap surrounds the end portion of the guide sleeve and is likewise within the part of the mold cavity assigned to the gas-injection nozzle. Preferably, the annular gap ends just rearwardly of the free end of the guide sleeve.

Other suitable configurations of these projections are conceivable. For example, in lieu of an annular cylinder surrounding the sleeve with a predetermined spacing, an O-ring or the like can be seated on the inner surface of the sleeve in such a manner that the cross section of the guide sleeve is likewise widened. Because of this configuration, the region between the gas-injection nozzle inserted into the mold cavity and the sleeve which surrounds the nozzle is widened in such a manner that the melt can be seated here. In this way, a gas-tight connection between the melt and the outer periphery of the end portion of the injection nozzle and the sleeve is provided as a consequence of the hardening of the melt. A type of labyrinth seal is provided when the sleeve is cylindrically configured and is provided with a cylindrical projection surrounding the sleeve so as to define an annular gap therewith. Leaks through this seal even for different viscosities of the melt or complicated cross-sectional forms of the hollow body to be injected are completely eliminated and the sealing action of this labyrinth seal is even increased when there is a rapid cooling of the plastic peripheral layer surrounding the sleeve. The actual ram of the gas-injection nozzle is preferably configured to have a tip at its end such as a conically-shaped tip and has a bore transverse to the longitudinal bore for allowing gas to escape. The ram of the gas-injection nozzle can be pushed forward a few seconds after introducing the melt into the mold cavity of the injection mold for injection of the gas until the transverse bore lies outside of the surrounding sleeve and the gas to be injected can discharge rapidly without loss.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
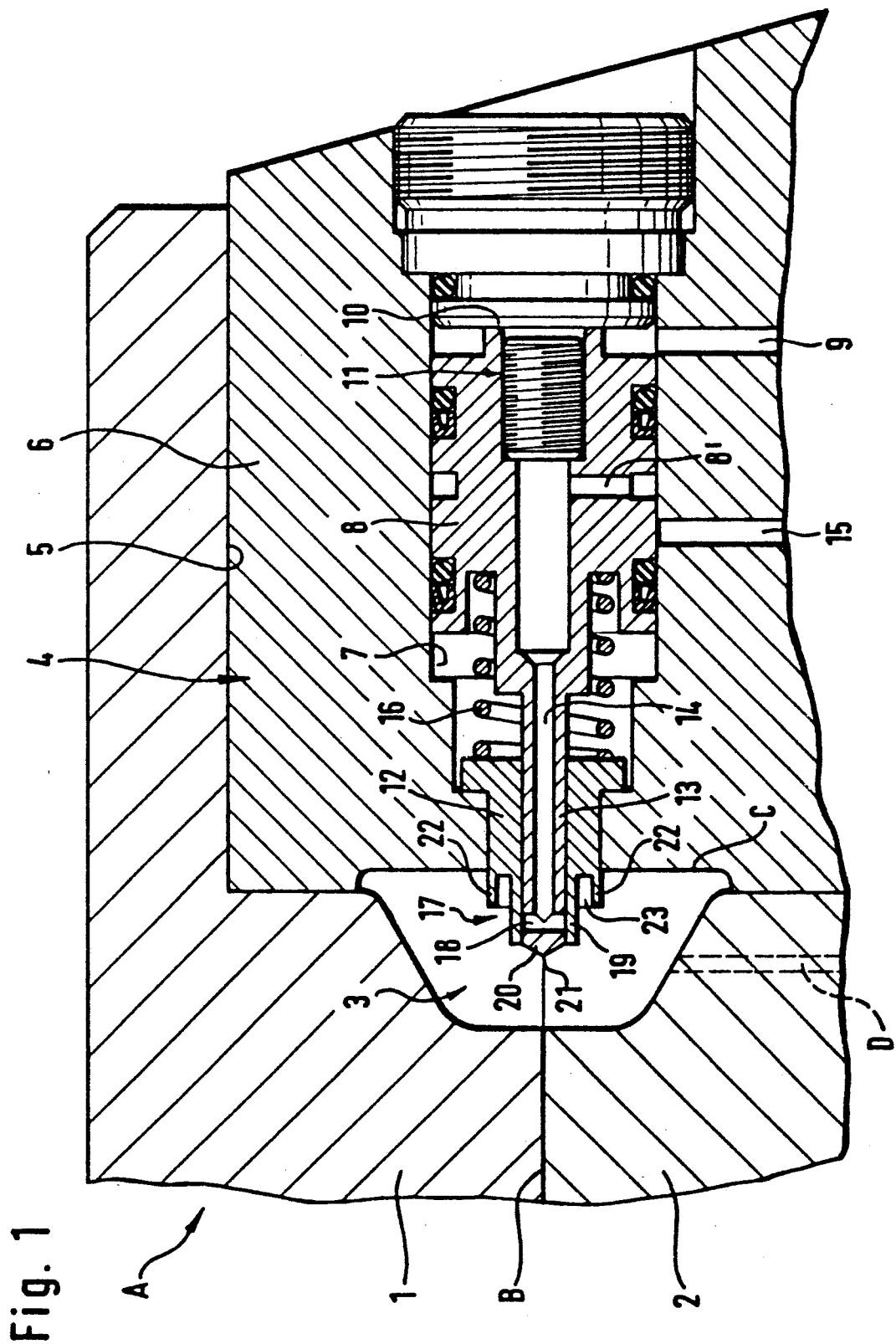
FIG. 1 is a partial section view, in elevation, of the injection mold with its two mold halves as well as an inlet channel for the plastic melt and the device for introducing a pregiven quantity of gas for generating an adequate gas inner pressure when forming the plastic body.

The injection mold form A shown in FIG. 1 includes mold parts 1 and 2 conjointly defining a partitioning plane identified by reference letter B. The injection mold parts (1 and 2) enclose a mold cavity 3 which corresponds in its form to the hollow plastic body which is to be produced.

Figure 2:
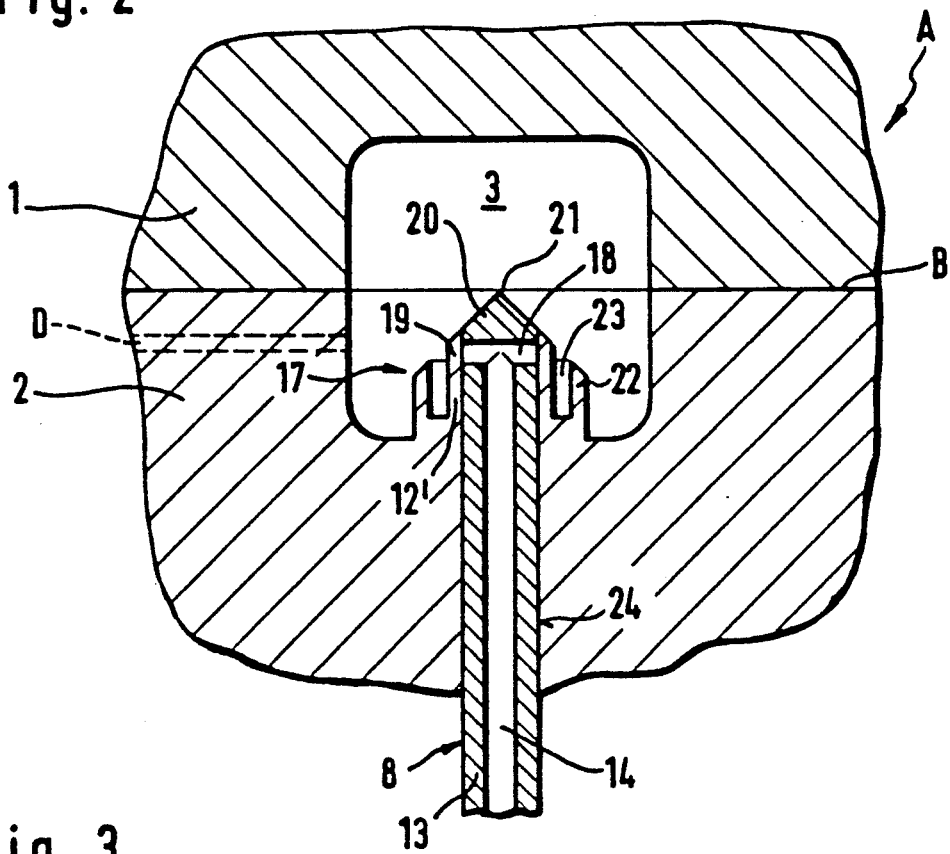
FIG. 2 is a schematic showing the same configuration as in FIG. 1 but with the injection device being partially part of the one mold half of the injection mold itself and in advance of the injection of the melt into the cavity of the mold; and, FIG. 3 shows the embodiment of FIG. 2 for the condition wherein the melt has already been injected into the mold cavity and while the gas is being metered into the melt.
Figure 3:
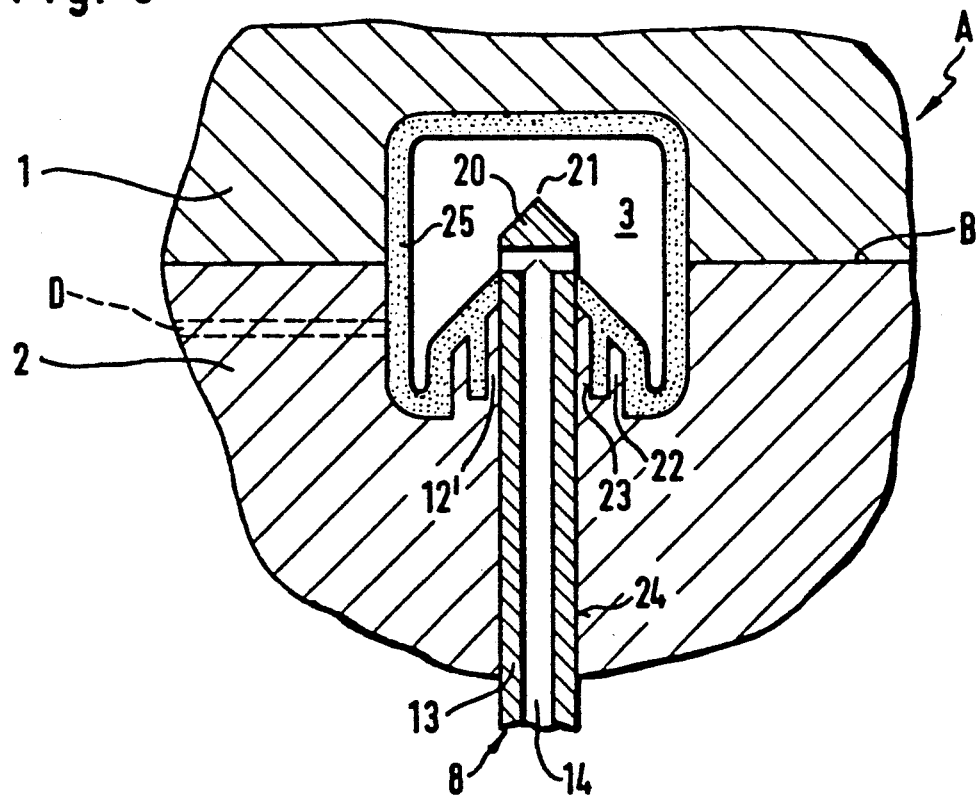

In the embodiment of FIG. 1, the cavity and therefore the finished plastic body have an approximately trapezoidal cross section. In the embodiment of FIGS. 2 and 3, this cross section is approximately square. The injection device for the gas such as nitrogen or air is identified as a unit by reference numeral 4. In FIG. 1, the injection device 4 is a part separate from the injection mold A and is seated in a corresponding recess 5 of both mold halves (1 and 2) such that this part defines the outer closure of the cavity with the wall section C. The injection channel D for the melt is disposed behind the plane of the drawing and is therefore shown in phantom outline.

The injection device 4 for the gas includes a base body 6 having a recess 7 into which an injection nozzle 8 having a ram 13 is seated. The base body 6 including the injection nozzle 8 are displaceable in the mold halves (1 and 2) and are displaced toward the right from the injection position shown in FIG. 1 when the completed plastic body is to be removed from the mold halves (1 and 2).

The injection nozzle 8 can be displaced backwards or forwards hydraulically, pneumatically or by means of a spring force in the direction toward the mold cavity within the recess 7 for injecting gas in the injection position shown. In the embodiment shown in FIG. 1, the longitudinal displacement takes place pneumatically via a channel 9 disposed in the base body 6 through which the rearward end of the rearward section of the gas-injection nozzle is charged with a pressure medium and with the rearward section being configured as a piston 11. In the forward region, the injection nozzle 8 has a guide in the form of a sleeve 12 in which the needle-like ram 13 of the injection nozzle 8 is guided. The guide 12 cannot be changed in position with respect to the injection mold 1. The ram 13 and the rearward portion of the nozzle 8 have a gas-conducting longitudinal channel 14. Gas to be injected into the mold flows through the channel 14 after a partial advance of the injection nozzle 8 with the ram 13. The gas then flows through the overlapping channels 8' of the injection nozzle 8 and the channel 15 in the base body 6 of the injection device into the longitudinal channel 14.

A control device (not illustrated) controls the advance of the gas-injection nozzle 8 and its ram 13. The nozzle 8 and ram 13 move against the force of spring 16 in the direction toward the cavity 3 from a closed position shown in FIG. 1 into the gas metering position. When the gas pressure in the feed channel 9 drops, the spring moves the nozzle 8 and ram 13 back into their closed position. Any other feed movement for the injection nozzle and ram 13 as well as other configurations of the injection nozzle 8 are possible.

The arrangement of FIG. 1 is provided solely for introducing a gas such as nitrogen, air or the like into the cavity 3 of the injection mold (1 and 2). The device of FIG. 1 builds up the inner gas pressure to form hollow plastic bodies from a liquid melt of a partially crystalline plastic and assures that uniform wall thicknesses and a defect-free surface of the hollow body are produced. During the production process, the plastic melt and gas are introduced into the cavity 3 in two phases in such a manner that first only the melt is injected into the cavity and, thereafter in a second phase, the pressurized gas is injected into the formable mass in such a manner that the melt completely fills out the cavity 3 and hardens under the gas pressure which is maintained.

According to the invention, the end 17 of the gas-injection nozzle 8 facing into the cavity 3 of the injection mold (1 and 2) is mounted approximately in the center of one part of the cavity assigned to the gas-injection nozzle 8. Accordingly, the forward end portion 17 of the gas-injection nozzle is disposed essentially centrally within the cavity 3 after the melt is introduced into the cavity. The forward end portion 17 of the gas-injection nozzle includes the forward portion of the guide sleeve 12 and the forward portion of the ram 13 guided in this guide sleeve. An outlet in the form of the opening of a longitudinal channel 14 provided in the ram 13 is disposed in the forward end of the ram. The gas passes through this outlet after displacement of the ram into the cavity after the cavity has been filled with the melt.

The ram 13 has a free end 17 disposed in the cavity 3 of the injection mold (1 and 2). At this free end, the ram 13 is configured so as to be closed and is provided with a transverse channel 18 in the region lying rearward of this closed end. The transverse channel 18 is connected with the gas-conducting longitudinal channel 14. This transverse channel 18 is closed by a cylindrical section 19 of the guide sleeve 12 when the ram 13 is in its closed position (see FIGS. 1 and 2). The closed end 20 of the ram 13 is provided with a tip 21. The forward end portion 17 can be configured so as to be conical as shown in the embodiments of FIGS. 2 and 3. If a layer of the melt solidifies to form a skin or a layer is formed as a consequence of the cooling of the melt, the sharp configuration of the end portion 17 permits the end portion to penetrate this layer when moving the ram 13 forward.

The end portion 17 of the injection nozzle is rapidly heated because of the parts of the injection nozzle 8 which are disposed within the cavity 3. The rapid heating results especially from the high temperature of the injected plastic melt which at least partially surrounds and is in contact engagement with this end portion 17. Accordingly, with the displacement of the ram 13 from the first position into the second position thereof, the melt which has perhaps already hardened in its outer regions is easily and rapidly penetrated because of the intense warming of the forward end portion 17. In this way, the penetration can take place without lifting the plastic part which is still formable in its interior and leaks are prevented from developing with the disadvantage of a loss of gas.

The forward parts (19, 20, 22) project into the cavity 3 and conjointly define the forward end portion 17 of the gas-injection nozzle 8. These parts should be made of a material having a high thermal capacity such as steel, aluminum or another good heat-conducting material so that they can be rapidly and intensely heated by the high temperature plastic melt which surrounds these parts. There is a further possibility of increasing the temperature of this forward end portion 17 of the nozzle 8 by means of the plastic melt; namely, the mass of the free end portion 17 of the ram 13 disposed in the cavity 3 can be configured so as to be greater than the portion of the guide sleeve 12 disposed in the cavity 3 and in surrounding relationship to the end portion 17. In order to achieve this condition, the end 20 having the tip 21 of the ram 13 is configured so as to be solid and made of an optimally heat-absorbing material whereas, the surrounding annular portion 19 of the sleeve 12 is thin-walled and/or made of a material of lesser heat-absorbing capacity.

In a further embodiment of the invention, the part of the guide sleeve 12 projecting into the cavity 3 is configured to have projections 22 which are preferably formed so as to be annular. With these projections, the outer cross section, and therefore the mass of the end portion 17 of the guide sleeve, is increased. The projections 22 can be configured as cams or the like. In a preferred embodiment, a ring-shaped projection 22 of the sleeve is formed which surrounds the sleeve in the form of an annular cylinder in such a manner that the outer wall of the sleeve 12 and the surrounding annular cylinder 22 conjointly define an annular gap 23. The annular cylinder 22 coaxially surrounds the cylindrical part 19 and the guide sleeve 12 and ends short of the end of the guide sleeve 12 which projects freely into the cavity. In this way, the outer surface of the guide sleeve 12 and of the cylindrically-shaped projection 22 lie axially symmetrically to the axis of the ram 13 with the cylindrically-shaped projection 22 surrounding the guide sleeve 12 in spaced relationship thereto.

The arrangement can also be so configured that the clear distance between the outer surface of the sleeve 12 and the inner peripheral surface of the cylindrical projection 22 surrounding the latter are adapted to the viscosity of the melt such that the melt at least approximately fills the annular space to form a labyrinth seal. The annular space here is the annular gap 23 between the outer surface of the sleeve 12 and the inner surface of the cylindrically-shaped projection 22.

The embodiment of FIGS. 2 and 3 show an arrangement wherein the ram 13 including a guide 12' is a part of the mold half 2 of the injection mold A. Reference numeral 3 likewise identifies the cavity wherein no plastic melt has yet been injected. The ram 13 is guided in a cutout 24 of the mold half 2 with the remaining parts of the injection nozzle 8 not being shown. The longitudinal channel 14 for metering the gas is disposed within the ram 13.

In FIG. 2, the longitudinally displaceable ram 13 is shown in its start position wherein the transverse bore 18 for discharging the gas into the cavity 3 is closed by the cylindrical portion 19 of the guide 12'. The guide 12' is here configured as a cylindrical sleeve in the same manner as the guide in the embodiment of FIG. 1. The sleeve guide 12' of FIG. 2 is an integral part of the form half 2 and is machined thereinto.

The forward portion of the ram 13 is configured so as to be conical and therefore, as in the embodiment of FIG. 1, has a transverse channel 18 in the form of a transverse bore for the gas discharge. In lieu of a through-extending transverse bore 18 as shown in FIGS. 1 and 2, the bore 18 can extend from the radius of the ram and so be configured as a half bore for the discharge of the gas to be injected. In this way, the gas discharges on only one side of the ram with a higher pressure than in the case of a through-extending bore 18.

In the closed position shown in FIG. 2, the ram 13 is disposed within the forward portion of the guide 12'. This forward portion 12' defines a type of guide sleeve for the ram and is freely disposed in the cavity 3 together with the closed end 20 of the ram 13. As described above, the injection nozzle 8 opens with its gas-discharge bore 18 into the cavity 3.

As shown in FIG. 3, the guide 12' is surrounded by a cylindrical projection 22. The guide 12' and projection 22 conjointly define an annular gap 23 which spaces the projection 22 from the guide 12'. The injected hot liquid plastic melt can at least partially flow into the annular gap 23 so that the cylindrical projection 22 and the forward end 19 of the guide 12' are closed by a labyrinth-type seal which forms when the ram 13 is pushed forward and the gas is injected. The labyrinth seal forms a tight gas seal and prevents gas from escaping.

FIG. 3 shows the arrangement with the ram 13 in its forward position and after the plastic melt has been injected, that is, in the gas-discharge position wherein the gas discharges through channel 14 and through transverse channel 18 into the cavity 3. As shown in FIG. 3, the plastic melt 25 is pressed uniformly against the walls of the cavity under the pressure of the introduced gas whereby a uniformly thick hollow body is formed having a smooth surface. The injected plastic quantity further encloses the cylindrical forward portion of the guide 12' in the manner of a labyrinth seal and can penetrate into the annular gap 23 between the guide 12' and the cylindrically configured projection 22. In this way, a complete seal against the leakage of gas is formed.

As shown in FIG. 3, the forward closed end 20 of the ram 13 is disposed in the gas-discharge position within the cavity 3 and has penetrated the plastic skin possibly formed in the injection phase of the plastic. This penetration of the plastic skin takes place without the loss of gas and/or without lifting the melt in the region where the gas-injection nozzle penetrates. This is made possible because the melt lies tightly and adheringly on the projection 22 which is preferably configured to have a cylindrical shape. For this reason, the melt can no longer lift as the injection nozzle penetrates.

The labyrinth seal described above can also be provided in another manner. What is essential is that the projection 22 is configured in the manner of a ring or projection in such a manner that the outer cross section of the guide 12' is increased in the radial direction by parts which extend therefrom. In this way, projections are formed which are ring-shaped or cam-shaped. As mentioned above, these projections can be formed of metallic or non-metallic materials. An element appropriate for this purpose is an O-ring.

Plastic bodies of uniform wall thickness and a clean skin free of surface imperfections can be produced with the arrangement according to the invention by performing the following steps for introducing the gas into the cavity of an injection mold. First, the melted plastic or the so-called plastic melt is injected into the cavity by means of a suitable injection device known per se. Directly thereafter, a predetermined quantity of gas such as nitrogen or air is injected via a gas-injection nozzle spaced from the location whereat the plastic is injected. The gas is injected in such a manner that the plastic is pressed with a uniform thickness against the walls of the cavity. During injection of the molten plastic mass, the forward end portion 17 of the gas-injection nozzle 8 is advanced into the cavity 3 with its gas-discharge opening 18 in such a manner that the plastic melt flowing into the form surrounds the end portion 17 of the gas-injection nozzle 8 at least partially with the end portion 17 being disposed approximately in the center of the mold. In this way, the end portion 17 is warmed by the plastic melt. Directly after the plastic mass is injected, the predetermined gas quantity (nitrogen or air) is injected into the cavity 3 under a pregiven pressure via the gas-injection nozzle 8.

It is understood that the foregoing description is that of the preferred embodiments of the invention and that various changes and modifications may be made thereto without departing from the spirit and scope of the invention as defined in the appended claims.

What is claimed is:

1. An arrangement for introducing a metered volume of gas into a cavity filled with a melt of plastic and defined by an injection mold for producing a hollow plastic body, the injection mold having an injection channel for introducing the molten plastic into the cavity and the arrangement comprising:

a gas-injection nozzle assembly having a housing mounted in the mold and a member displaceably mounted in said housing so as to be movable between a first position and a second position located in spaced relationship to the injection channel;

said housing and said member conjointly defining a forward end portion of said nozzle assembly facing into said cavity at a region of said cavity spaced from the injection channel;

gas-conducting means formed in said forward end portion for conducting the gas into said cavity when said member is in said second position;

said gas-conducting means defining a gas-discharge opening for discharging the gas into said cavity;

projecting means for freely projecting said gas-discharge opening approximately into the center of said region for discharging the gas when said member is in said second position and while said melt is injected into said cavity;

said projecting means including a ram arranged on said member and guide means for defining a guide channel for accommodating said ram therein;

said gas-conducting means including a first gas-conducting channel formed in said housing and a second gas-conducting channel formed in said ram for communicating with said first gas-conducting channel when said member is in said second position;

said ram defining a longitudinal axis and having a front end portion for extending into said cavity when said member is in said second position; said front end portion having a closed forward sharp tipped end face for penetrating through said melt of plastic when said member moves into said second position and said ram having a transverse channel formed in said front end portion so as to extend transverse to said axis; and, said transverse channel being part of said second gas-conducting channel and defining said gas-discharge opening; and, said member being mounted in said housing so as to cause said gas-discharge opening to be within said guide channel when said member is in said first position thereby closing off said opening.

2. The arrangement of claim 1, said housing including a primary part seated in said mold and a secondary part mounted in said primary part; and, said secondary part being said guide means configured as a guide sleeve for guiding said ram into said cavity.

3. The arrangement of claim 2, said guide sleeve having a cylindrical portion formed thereon so as to extend into said cavity for guiding said front end portion of said ram; and, said front end portion having a mass greater than the mass of said cylindrical portion.

4. The arrangement of claim 3, said guide sleeve having a projection formed thereon so as to extend into said cavity laterally of said cylindrical portion.

5. The arrangement of claim 4, said projection being an annular projection formed on said guide sleeve in surrounding and spaced relationship to said cylindrical portion, said cylindrical portion and said annular projection conjointly defining an annular gap for receiving a portion of the melt therein.

6. The arrangement of claim 5, said annular portion being disposed in surrounding relationship to said cylindrical portion so as to be symmetrical with respect to said axis and said cylindrical portion.

7. The arrangement of claim 5, said annular gap having a clear gap width selected in correspondence to the viscosity of the plastic melt.

8. The arrangement of claim 1, said mold having two mold parts coacting to define said cavity and said guide means being defined by one of said mold parts and being a guide formed in said one mold part for guiding said ram during the movement of said member between said positions.

9. The arrangement of claim 1, said forward end face having a conical shape.

10. The arrangement of claim 1, said forward end portion of said nozzle assembly being made of a material having a high thermal conductivity.

11. The arrangement of claim 10, said material being selected from the group consisting of steel and aluminum.

* * * * *